(12) United States Patent
Yoo et al.

(10) Patent No.: US 11,797,047 B2
(45) Date of Patent: *Oct. 24, 2023

(54) DISPLAY DEVICE

(71) Applicant: Samsung Display Co., Ltd., Yongin-si (KR)

(72) Inventors: Bugyoon Yoo, Hwaseong-si (KR); Yunjae Kim, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 18 days.

This patent is subject to a terminal disclaimer.

(21) Appl. No.: 17/536,065

(22) Filed: Nov. 28, 2021

(65) Prior Publication Data

US 2022/0100229 A1 Mar. 31, 2022

Related U.S. Application Data

(63) Continuation of application No. 17/089,701, filed on Nov. 4, 2020, now Pat. No. 11,216,029.

(30) Foreign Application Priority Data

Feb. 14, 2020 (KR) .......................... 10-2020-0018561

(51) Int. Cl.
*G06F 1/16* (2006.01)
*G06F 1/20* (2006.01)
*H04M 1/02* (2006.01)

(52) U.S. Cl.
CPC ............ *G06F 1/1616* (2013.01); *G06F 1/203* (2013.01); *H04M 1/0268* (2013.01)

(58) Field of Classification Search
CPC ...... G06F 1/1616; G06F 1/203; G06F 1/1652; G06F 2203/04102; H04M 1/0268;
(Continued)

(56) References Cited

U.S. PATENT DOCUMENTS 9,961,809 B1 * 5/2018 Yoon ................... H01L 23/3735
10,620,668 B2 4/2020 Park et al.
(Continued)

FOREIGN PATENT DOCUMENTS

EP 3697184 8/2020
JP 2010266777 11/2010
(Continued)

OTHER PUBLICATIONS

Notice of Allowance dated Aug. 25, 2021, issue to U.S. Appl. No. 17/089,701.

*Primary Examiner* — Abhishek M Rathod
(74) *Attorney, Agent, or Firm* — H.C. Park & Associates, PLC

(57) ABSTRACT

Provided is a display device including a display module in which a folding region and first and second non-folding regions facing each other and a heat dissipation sheet disposed on one surface thereof. The heat dissipation sheet includes a first heat dissipation adhesive layer including a first adhesive portion overlapping the first non-folding region and a second adhesive portion overlapping the second non-folding region, a second heat dissipation adhesive layer including a third adhesive portion overlapping the first adhesive portion and a fourth adhesive portion overlapping the second adhesive portion, a heat dissipation layer including a first heat dissipation portion disposed between the first adhesive portion and the third adhesive portion and a second heat dissipation portion disposed between the second adhesive portion and the fourth adhesive portion, and an auxiliary adhesive layer including a first auxiliary adhesive portion disposed between the first adhesive portion and the third adhesive portion.

20 Claims, 13 Drawing Sheets

(58) Field of Classification Search
CPC .. H04M 1/0216; G09F 9/301; H05K 7/20954; H10K 59/12
See application file for complete search history.

(56) References Cited

U.S. PATENT DOCUMENTS

| | | |
|---|---|---|
| 10,932,376 B2 | 2/2021 | Park et al. |
| 2005/0068738 A1 | 3/2005 | Kim et al. |
| 2016/0209874 A1 | 7/2016 | Choi et al. |
| 2016/0212890 A1 | 7/2016 | Jeong et al. |
| 2019/0334114 A1 | 10/2019 | Park |
| 2020/0245501 A1 | 7/2020 | Wu et al. |
| 2021/0068270 A1 | 3/2021 | Zhou et al. |

FOREIGN PATENT DOCUMENTS

| | | |
|---|---|---|
| KR | 10-0529112 | 11/2005 |
| WO | 2019076081 | 4/2019 |

* cited by examiner

DISPLAY DEVICE

CROSS-REFERENCE TO RELATED APPLICATIONS

This application is a continuation of U.S. patent application Ser. No. 17/089,701 filed on Nov. 4, 2020, which claims priority from and the benefit of Korean Patent Application No. 10-2020-0018561, filed on Feb. 14, 2020, which are hereby incorporated by reference for all purposes as if fully set forth herein.

BACKGROUND

Field

Exemplary embodiments and implementations of the invention relate generally to display panels and, more specifically, to foldable display panels.

Discussion of the Background

The inventive concepts herein relate to a display device, and more particularly, to a display device that is foldable.

Various display devices used in multimedia equipment such as televisions, mobile phones, table computers, navigation devices, and game consoles are being developed. The display device may include a display module displaying an image and sensing an external input, a polarizing layer disposed on the display panel, and a window. The display module may include a display panel displaying an image and an input sensing layer sensing an external input.

In addition, the display device may be disposed below the display module and include a heat dissipation layer that emits heat within the display device.

The above information disclosed in this Background section is only for understanding of the background of the inventive concepts, and, therefore, it may contain information that does not constitute prior art.

SUMMARY

The inventive concepts provide a display device that prevents a heat dissipation layer from moving.

Additional features of the inventive concepts will be set forth in the description which follows, and in part will be apparent from the description, or may be learned by practice of the inventive concepts.

An embodiment of the inventive concept provides a display device including: a display module in which a folding region that is folded with respect to a folding axis and first and second non-folding regions facing each other with the folding region therebetween are defined; and a heat dissipation sheet disposed on one surface of the display module, wherein the heat dissipation sheet includes: a first heat dissipation adhesive layer including a first adhesive portion overlapping the first non-folding region and a second adhesive portion overlapping the second non-folding region; a second heat dissipation adhesive layer including a third adhesive portion overlapping the first adhesive portion and a fourth adhesive portion overlapping the second adhesive portion; a heat dissipation layer including a first heat dissipation portion disposed between the first adhesive portion and the third adhesive portion and a second heat dissipation portion disposed between the second adhesive portion and the fourth adhesive portion; and an auxiliary adhesive layer including a first auxiliary adhesive portion disposed between the first adhesive portion and the third adhesive portion to surround the first heat dissipation portion on a plane and a second auxiliary adhesive portion disposed between the second adhesive portion and the fourth adhesive portion to surround the second heat dissipation portion on the plane.

In an embodiment, the first heat dissipation portion may be sealed by the first adhesive portion, the third adhesive portion, and the first auxiliary adhesive portion, and the second heat dissipation portion may be sealed by the second adhesive portion, the fourth adhesive portion, and the second auxiliary adhesive portion.

In an embodiment, the first heat dissipation portion and the first auxiliary adhesive portion may be spaced apart from each other, and the second heat dissipation portion and the second auxiliary adhesive portion may be spaced apart from each other.

In an embodiment, each of the first auxiliary adhesive portion and the second auxiliary adhesive portion may include: a base layer; a first adhesive layer disposed between the base layer and the first heat dissipation adhesive layer; and a second adhesive layer disposed between the base layer and the second heat dissipation adhesive layer.

In an embodiment, each of the first heat dissipation adhesive layer and the second heat dissipation adhesive layer may include a single adhesive layer.

In an embodiment, at least one sensor opening passing through the first adhesive portion, the third adhesive portion, and the first auxiliary adhesive portion may be defined.

In an embodiment, the display device may further include at least one cover member disposed between the heat dissipation sheet and the display module, wherein the sensor opening may pass through the at least one cover member.

In an embodiment, the first heat dissipation portion may include a plurality of first openings, which are spaced apart from each other, and the first adhesive portion and the third adhesive portion adhere to each other through the first openings, and the second heat dissipation portion may include a plurality of second openings, which are spaced apart from each other, and the second adhesive portion and the fourth adhesive portion adhere to each other through the second openings.

In an embodiment, each of the first adhesive portion and the third adhesive portion, which overlap the first openings, may have a recessed shape, and each of the second adhesive portion and the fourth adhesive portion, which overlap the second openings, may have a recessed shape.

In an embodiment, the heat dissipation layer may have a thickness greater than the sum of thicknesses of the first heat dissipation adhesive layer and the second heat dissipation adhesive layer in a thickness direction of the display module.

In an embodiment, the first adhesive portion and the second adhesive portion may be spaced apart from each other with the folding axis therebetween.

In an embodiment, the heat dissipation sheet may not overlap the folding region.

In an embodiment, at least a portion of each of the first auxiliary adhesive portion and the second auxiliary adhesive portion may overlap the folding region.

In an embodiment, at least a portion of each of the first heat dissipation portion and the second heat dissipation portion may overlap the folding region.

In an embodiment, each of the first heat dissipation portion and the second heat dissipation portion may not overlap the folding region.

In an embodiment, the display device may further include: a plate disposed between the display module and the first heat dissipation adhesive layer; and an insulating film disposed below the second heat dissipation adhesive layer.

In an embodiment, the plate may include a first plate overlapping the first adhesive portion and a second plate spaced apart from the first plate and overlapping the second adhesive portion, and the insulating film may include a first insulation film overlapping the first plate and a second insulating film spaced apart from the first insulation film and overlapping the second plate.

In an embodiment, the first heat dissipation portion may at least partially contact the first auxiliary adhesive portion.

In an embodiment, the heat dissipation layer may include a polyimide material.

In an embodiment, each of the first heat dissipation adhesive layer and the second heat dissipation adhesive layer may include a pressure sensitive adhesive, and the auxiliary adhesive layer may include a double-sided adhesive tape.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1A:
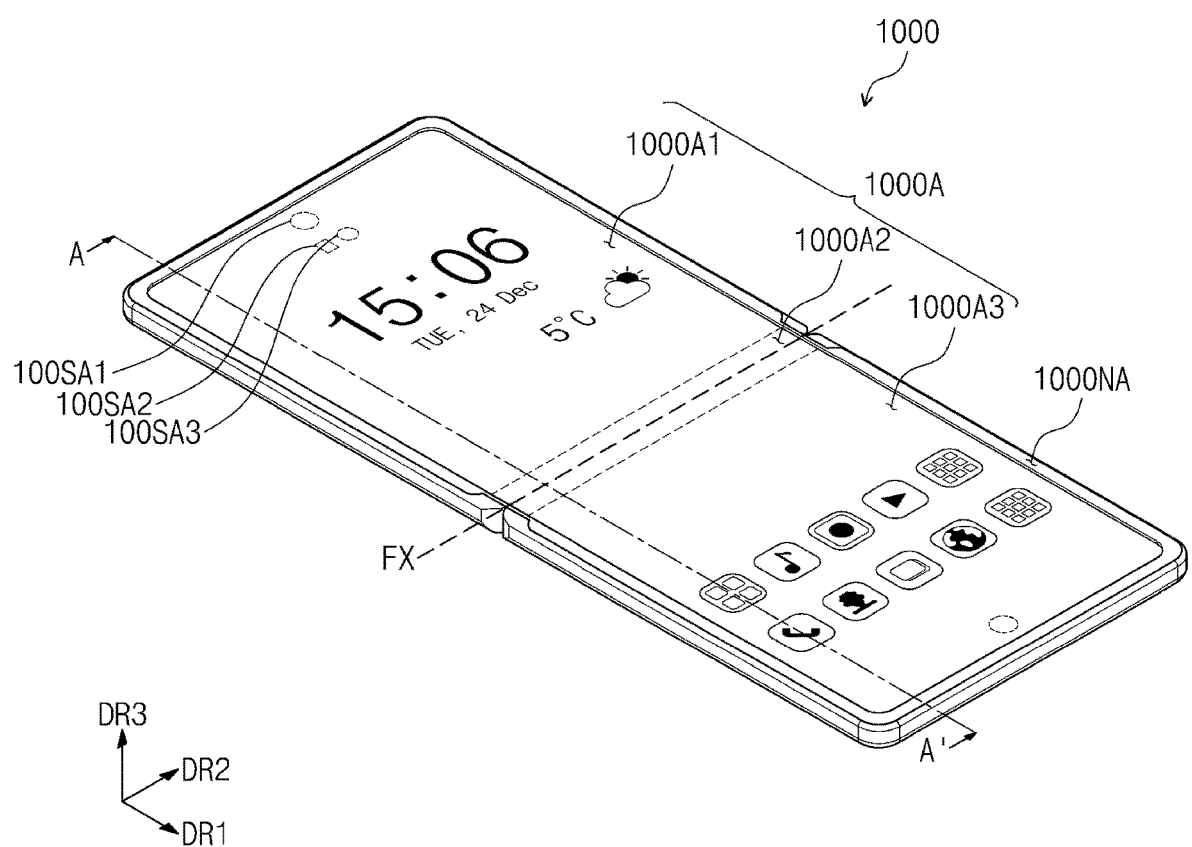
FIG. 1A is a perspective view illustrating a display device according to an embodiment of the inventive concept.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

In this specification, it will also be understood that when one component (or region, layer, portion) is referred to as being "on", "connected to", or "coupled to" another component, it can be directly disposed/connected/coupled on/to the one component, or an intervening third component may also be present.

Like reference numerals refer to like elements throughout. Also, in the figures, the thickness, ratio, and dimensions of components are exaggerated for clarity of illustration.

The term "and/or" includes any and all combinations of one or more of the associated listed items.

It will be understood that although the terms such as 'first' and 'second' are used herein to describe various elements, these elements should not be limited by these terms. The terms are only used to distinguish one component from other components. For example, a first element referred to as a first element in one embodiment can be referred to as a second element in another embodiment without departing from the scope of the appended claims. The terms of a singular form may include plural forms unless referred to the contrary.

Also, "under", "below", "above", "upper", and the like are used for explaining relation association of components illustrated in the drawings. The terms may be a relative concept and described based on directions expressed in the drawings.

Unless otherwise defined, all terms (including technical and scientific terms) used herein have the same meaning as commonly understood by a person of ordinary skill in the art to which this invention belongs. Also, terms such as defined terms in commonly used dictionaries are to be interpreted as having meanings consistent with meaning in the context of the relevant art and are expressly defined herein unless interpreted in an ideal or overly formal sense.

The meaning of "include" or "comprise" specifies a property, a fixed number, a step, an operation, an element, a component or a combination thereof, but does not exclude other properties, fixed numbers, steps, operations, elements, components or combinations thereof.

Hereinafter, exemplary embodiments of the inventive concept will be described with reference to the accompanying drawings.

Figure 1B:
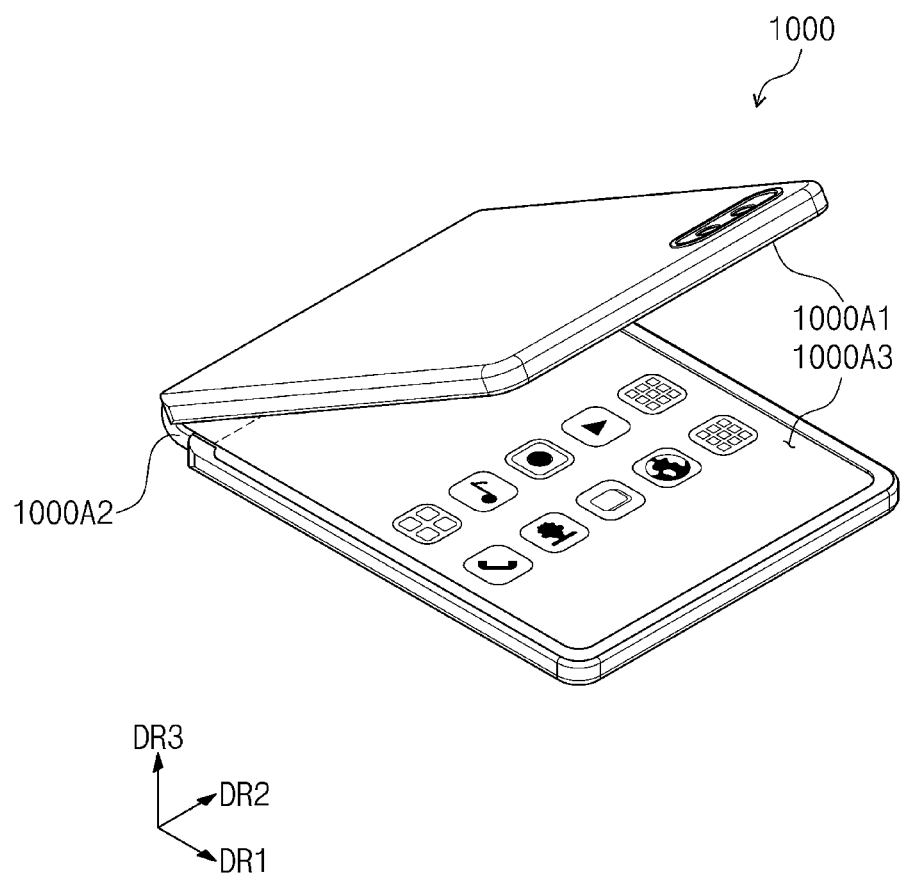
FIG. 1B is a perspective view illustrating a display device according to an embodiment of the inventive concept.

FIG. 1A is a perspective view illustrating a display device according to an embodiment of the inventive concept. FIG. 1B is a perspective view illustrating a display device according to an embodiment of the inventive concept. FIG. 1A illustrates an unfolded state of a display device 1000, and FIG. 1B illustrates a folded state of the display device 1000.

Referring to FIGS. 1A and 1B, the display device 1000 may be a device that is activated according to an electrical signal. For example, the display device 1000 may be a mobile phone, a tablet PC, a car navigation system, a game console, or a wearable device, but is not limited thereto. In FIG. 1A, the display device 1000 is exemplarily illustrated as a mobile phone.

The display device 1000 may display an image through an active region 1000A. In a state in which the display device 1000 is unfolded, the active region 1000A may include a plane defined by a first direction DR1 and a second direction DR2. A thickness direction of the display device 1000 may be parallel to a third direction DR3 crossing the first direction DR1 and the second direction DR2. Thus, a front surface (or top surface) and a rear surface (or bottom surface) of each of members constituting the display device 1000 may be defined based on the third direction DR3.

The active region 1000A may include a first region 1000A1, a second region 1000A2, and a third region 1000A3. The second region 1000A2 may be bent or folded with respect to a folding axis FX extending along the second direction DR2. Thus, the first region 1000A1 may be referred to as a first non-folding region, the third region 1000A3 may be referred to as a second non-folding region, and the second region 1000A2 may be referred to as a folding region. The non-folding regions 1000A and 1000C are configured to not fold within their respective structures, but to fold about the folding axis FX.

When the display device 1000 is folded, the first region 1000A1 and the third region 1000A3 may face each other. Thus, in a fully folded state, the active region 1000A may not be exposed to the outside, which may be referred to as in-folding. However, this is merely an example, and an operation of the display device 1000 is not limited thereto.

For example, in an embodiment of the inventive concept, when the display device 1000 is folded, the first region 1000A1 and the third region 1000A3 may be opposite to each other. Thus, in the folded state, the active region 1000A may be exposed to the outside, which may be referred to as out-folding.

The display device 1000 may be configured to perform only one operation of the in-folding and the out-folding. Alternatively, the display device 1000 may be configured to perform all operations of the in-folding and the out-folding. In this case, the same area of the display device 1000, for example, the second region 1000A2 may be in-folded and out-folded. Alternatively, one area of the display device 1000 may be in-folded, and the other area may be out-folded.

FIGS. 1A and 1B, one folding region and two non-folding regions are illustrated as an example, but the number of folding and non-folding regions is not limited thereto. For example, the display device 1000 may include more than two folding regions, i.e., a plurality of non-folding regions and a plurality of folding regions disposed between the non-folding regions adjacent to each other.

FIGS. 1A and 1B illustrate that a folding axis FX is parallel to a short axis from one long side to another of the display device 1000, but the embodiment of the inventive concept is not limited thereto. For example, the folding axis FX may extend along a long axis of the display device 1000 from one short side to another, for example, in a direction parallel to the first direction DR1. In this case, the first region 1000A1, the second region 1000A2, and the third region 1000A3 may be sequentially arranged along the second direction DR2.

A plurality of sensing areas 100SA1, 100SA2, and 100SA3 may be defined on the display device 1000. In FIG. 1A, the three sensing areas 100SA1, 100SA2, and 100SA3 are exemplarily illustrated, but the number of plurality of sensing areas 100SA1, 100SA2, and 100SA3 is not limited thereto.

The plurality of sensing areas 100SA1, 100SA2, and 100SA3 may include a first sensing area 100SA1, a second sensing area 100SA2, and a third sensing area 100SA3. For example, the first sensing area 100SA1 may overlap a camera module, and the second sensing area 100SA2 and the third sensing area 100SA3 may overlap a proximity illumination sensor, but is not limited thereto.

Electronic modules corresponding to the camera module and various sensors may receive an external input transmitted through the first sensing area 100SA1, the second sensing area 100SA2, or the third sensing area 100SA3 or may provide an output through the first sensing area 100SA1, the second sensing area 100SA2, or the third sensing area 100SA3.

The first sensing area 100SA1 may be surrounded by the active region 1000A, and the second sensing area 100SA2 and the third sensing area 100SA3 may be included in the active region 1000A. That is, the second sensing area 100SA2 and the third sensing area 100SA3 may display an image. Each of the first sensing area 100SA1, the second sensing area 100SA2, and the third sensing area 100SA3 may have transmittance greater than that of the active region 1000A. Also, the first sensing area 100SA1 may have transmittance greater than each of those of the second sensing area 100SA2 and the third sensing area 100SA3.

Figure 2:
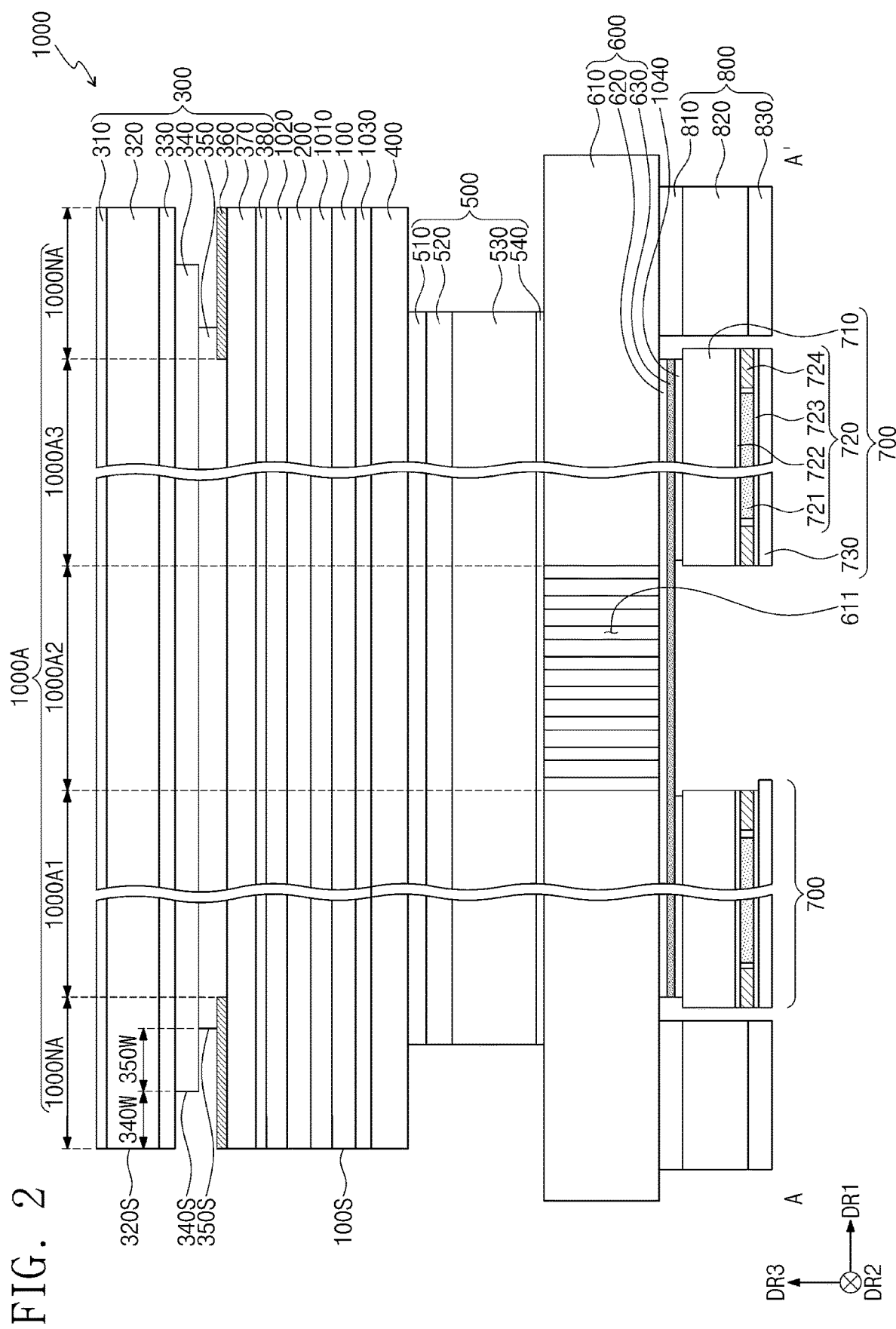
FIG. 2 is a cross-sectional view taken along line A-A' of FIG. 1A according to embodiment of the inventive concept.
Figure 3:
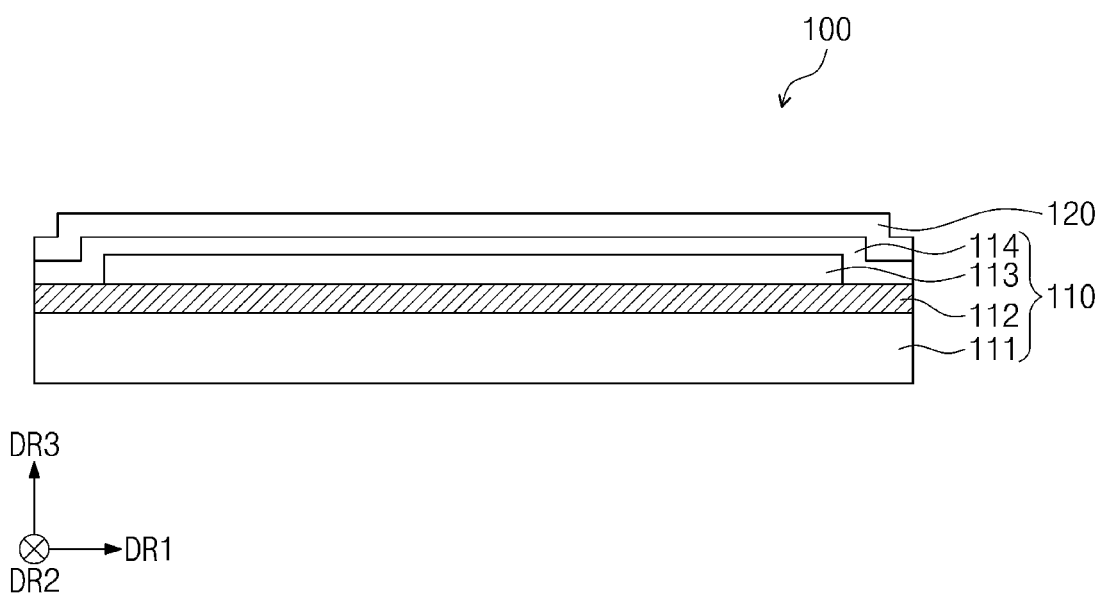
FIG. 3 is a cross-sectional view illustrating a display panel according to an embodiment of the inventive concept.

FIG. 2 is a cross-sectional view taken along line A-A' of FIG. 1A according to embodiment of the inventive concept. FIG. 3 is a cross-sectional view illustrating the display panel according to an embodiment of the inventive concept.

Referring to FIG. 2, the display device 1000 may include a display module 100, upper functional layers, and lower functional layers.

Referring to FIG. 3, the display module 100 may be configured to generate an image and sense an input applied from the outside. For example, the display module 100 may include a display panel 110 and an input sensing layer 120. The display module 100 may have a thickness of about 30 micrometers, and the thickness of the display module 100 is not limited thereto.

The display panel 110 may be configured to substantially generate an image. The display panel 110 may be an emission-type display layer, for example, the display panel 110 may be an organic light emitting display layer, a quantum dot display layer, or a micro LED display layer.

The display panel 110 may include a base layer 111, a circuit layer 112, a light emitting element layer 113, and an encapsulation layer 114.

The base layer 111 may include a synthetic resin film. The synthetic resin layer may include a thermosetting resin. The base layer 111 may have a multi-layered structure. For example, the base layer 111 may have a three-layered structure constituted by a synthetic resin layer, an adhesive layer, and a synthetic resin layer. Particularly, the synthetic resin layer may be a polyimide resin layer, and the material thereof is not particularly limited. The synthetic resin layer may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyamide-based resin, or a perylene-based resin. In addition, the base layer 111 may include a glass substrate or an organic/inorganic composite substrate.

The circuit layer 112 may be disposed on the base layer 111. The circuit layer 112 may include an insulation layer, a semiconductor pattern, a conductive pattern, and a signal line. The insulating layer, the semiconductor layer, and the conductive layer may be formed on the base layer 111 in a manner such as coating or vapor deposition, and then, the insulating layer, the semiconductor layer, and the conductive layer may be selectively patterned through a plurality of photolithography processes. Thereafter, the semiconductor pattern, the conductive pattern, and the signal line included in the circuit layer 112 may be formed.

The light emitting element layer 113 may be disposed on the circuit layer 112. The light emitting element layer 113 may include a light emitting element. For example, the light emitting element layer 113 may include an organic light emitting material, quantum dots, quantum rods, or micro LEDs.

The encapsulation layer 114 may be disposed on the light emitting element layer 113. The encapsulation layer 114 may include an inorganic layer, an organic layers, and an inorganic layer, which are sequentially laminated, but layers constituting the encapsulation layer 114 are not limited thereto.

The inorganic layers may protect the light emitting element layer 113 against moisture and oxygen, and the organic layer may protect the light emitting element layer 113 against foreign substances such as dust particles. The inorganic layers may include a silicon nitride layer, a silicon oxy nitride layer, a silicon oxide layer, a titanium oxide layer, or an aluminum oxide layer. The organic layer may include an acrylic-based organic layer, but the embodiment of the inventive concept is not limited thereto.

The input sensing layer 120 may be disposed on the display panel 110. The input sensing layer 120 may sense an external input applied from the outside. The external input may be a user's input. The user's input may include various types of external inputs such as a portion of user's body, light, heat, a pen, a pressure, or the like.

The input sensing layer 120 may be disposed on the display panel 110 through a continuous process. In this case, the input sensing layer 120 may be expressed as being directly disposed on the display panel 110. Being directly disposed may mean that a third component, for example, an adhesive member or other layer is not disposed between the input sensing layer 120 and the display panel 110.

Alternatively, the input sensing layers 120 may be bonded to the display panel 110 through an adhesive member. The adhesive member may include a common adhesive or an adhesive agent.

Referring again to FIG. 2, the upper functional layers may be disposed on the display module 100. For example, the upper functional layers may include an anti-reflection member 200 and an upper member 300.

The anti-reflection member 200 may be referred to as an anti-reflection layer. The anti-reflection member 200 may reduce reflectance of external light incident from the outside. The anti-reflection member 200 may include a stretched synthetic resin film. For example, the anti-reflection member 200 may be provided by dyeing an iodine compound on a polyvinyl alcohol film (PVA film). However, this is merely an example, and the material constituting the anti-reflection member 200 is not limited thereto. The anti-reflection member 200 may have a thickness of about 31 micrometers, and the thickness of the anti-reflection member 200 is not limited thereto.

The anti-reflection member 200 may be bonded to the display module 100 through the first adhesive layer 1010. The first adhesive layer 1010 may be a transparent adhesive layer such as a pressure sensitive adhesive film (PSA), an optically clear adhesive film (OCA), or an optically clear resin (OCR). Hereinafter, the adhesive member may include a general adhesive or adhesive agent. The first adhesive layer 1010 may have a thickness of about 25 micrometers, and the thickness of the first adhesive layer 1010 is not limited thereto.

In an embodiment of the inventive concept, the first adhesive layer 1010 may be omitted. In this case, the anti-reflection member 200 may be directly disposed on the display module 100. In the case of the display module 100, a separate adhesive layer may not be disposed between the anti-reflection member 200 and the display module 100.

The upper member 300 may be disposed on the anti-reflection member 200. The upper member 300 includes a first hard coating layer 310, a protective layer 320, a first upper adhesive layer 330, a window 340, a second upper adhesive layer 350, a light blocking layer 360, an impact absorbing layer 370, and a second hard coating layer 380. The components included in the upper member 300 are not limited to the components described above. At least a portion of the above-described components may be omitted, and other components may be added.

The first hard coating layer 310 may be a layer disposed on the outermost surface of the display device 1000. The first hard coating layer 310 may be a functional layer configured to improve use characteristics of the display device 1000 and may be coated to be provided on the protective layer 320. For example, anti-fingerprint properties, anti-pollution properties, and anti-scratch properties may be improved by the first hard coating layer 310.

The protective layer 320 may be disposed below the first hard coating layer 310. The constituents disposed below the protective layer 320 may be protected by the protective layer 320. The first hard coating layer 310, the anti-fingerprint layer, and the like may be additionally provided on the protective layer 320 to improve properties such as chemical resistance and abrasion resistance. The protective layer 320 may include a film having an elastic modulus of about 15 GPa or less at room temperature. The protective layer 320 may have a thickness of about 55 micrometers, but the thickness of the protective layer 320 is not limited thereto. In an embodiment, the protective layer 320 may be omitted.

The first upper adhesive layer 330 may be disposed below the protective layer 320. The protective layer 320 and the window 340 may be bonded to each other by the first upper adhesive layer 330. The first upper adhesive layer 330 may have a thickness of about 25 micrometers, but the thickness of the first upper adhesive layer 330 is not limited thereto.

The window 340 may be disposed below the first upper adhesive layer 330. The window 340 may include an optically transparent insulation material. For example, the window 340 may include a glass substrate or a synthetic resin film. When the window 340 is the glass substrate, the window 340 may have a thickness of about 80 micrometers or less and may have, for example, a thickness of about 30 micrometers, but the thickness of the window 340 is not limited thereto.

When the window 340 is the synthetic resin film, the window 340 may include a polyimide (PI) film or a polyethylene terephthalate (PET) film.

The window 340 may has a single layered structure or a multilayered structure. For example, the window 340 may include a plurality of plastic films bonded to each other by using an adhesive or include a glass substrate and a plastic film, which are bonded to each other by using an adhesive.

The second upper adhesive layer 350 may be disposed below the window 340. The window 340 and the impact absorbing layer 370 may be bonded to each other by the second upper adhesive layer 350. The second upper adhesive layer 350 may have a thickness of about 35 micrometers, but the thickness of the second upper adhesive layer 350 is not limited thereto.

In an embodiment of the inventive concept, a sidewall 340S of the window 340 and a sidewall 350S of the second upper adhesive layer 350 may be disposed inside sidewalls of other layers, for example, a sidewall 100S of the display module 100 and a sidewall 320S of the protective layer 320. Being disposed to the inside may mean that the active region 1000A is closer to some objects than others.

A positional relationship between the layers may be changed by the folding operation of the display device 1000. According to an embodiment of the inventive concept, because the sidewall 340S of the window 340 is disposed inside the sidewall 100S of the display module 100 and the sidewall 320S of the protective layer 320, even though the positional relationship between the layers is changed, a possibility that the sidewall 340S of the window 340 protrudes from the sidewall 320S of the protective layer 320 may be reduced. Thus, a possibility that an external impact is transmitted through the sidewall 340S of the window 340 may be reduced. As a result, a probability that cracks occur in the window 340 may be reduced.

A first distance 340W between the sidewall 340W of the window 340 and the sidewall 320S of the protective layer 320 may be greater than or equal to a predetermined distance. Here, the first distance 340W may refer to a distance in a direction parallel to the first direction DR1. Also, the first distance 340W may correspond to a distance between the sidewall 340S and the sidewall 320S when viewed on a plane.

The first distance 340W may be about 196 micrometers, but is not limited thereto. For example, the first distance 340W may be about 50 micrometers or more and may be about 300 micrometers. As the first distance 340W increases, the protective layer 320 may further protrude from the window 340, and a portion of the protective layer 320 may be bent and attached to other components, for example, a case. Also, as the protective layer 320 increases in surface area, a probability that foreign substances introduced from an upper side of the protective layer 320 are introduced to a lower side of the protective layer 320 may be reduced.

Also, the window 340 and the second upper adhesive layer 350 may be bonded to the impact absorbing layer 370 through a lamination process. In consideration of a lamination process tolerance, each of the window 340 and the second upper adhesive layer 350 may have a surface area less than that of the impact absorbing layer 370. In addition, the second upper adhesive layer 350 may have a surface area less than that of the window 340. For example, a pressure may be applied to the second upper adhesive layer 350 in the process of attaching the window 340. The second upper adhesive layer 350 may receive the pressure and then be stretched in a direction parallel to the first direction DR1 and the second direction DR2. Here, the second upper adhesive layer 350 may have a surface area less than that of the window 340 so that the second upper adhesive layer 350 does not protrude from the window 340.

Unlike the embodiment of the inventive concept, when the first upper adhesive layer 330 and the second upper adhesive layer 350 are attached to each other, the window 340 may not slip to prevent a buckling phenomenon from occurring when the display device 1000 is folded. However, according to an embodiment of the inventive concept, the second upper adhesive layer 350 may have a surface area less than that of the window 340. Thus, the first upper adhesive layer 330 may not be attached to the second upper adhesive layer 350, and a probability that foreign substances adhere to the second upper adhesive layer 350 may be reduced.

A second distance 350W between the sidewall 350S of the second upper adhesive layer 350 and the sidewall 320S of the protective layer 320 may be greater than or equal to a predetermined distance. Here, the second distance 350W may refer to a distance in a direction parallel to the first direction DR1. Also, the second distance 350W may correspond to a distance between the side wall 350S and the sidewall 320S when viewed on the plane.

The second distance 350W may be about 392 micrometers, but is not limited thereto. For example, the second distance 350W may be selected from a range between about 292 micrometers and about 492 micrometers, but is not limited to this range.

The light blocking layer 360 may be disposed between the impact absorbing layer 370 and the second upper adhesive layer 350. The light blocking layer 360 may be provided by being printed on a top surface of the impact absorbing layer 370. The light blocking layer 360 may overlap a peripheral region 1000NA. The light blocking layer 360 may be a colored layer and may be formed in a coating manner. The light blocking layer 360 may include a colored organic material or an opaque metal, and the materials constituting the light blocking layer 360 are not limited thereto.

In FIG. 2, the light blocking layer 360 is exemplarily illustrated as being disposed on the top surface of the impact absorbing layer 370, but the position of the light blocking layer 360 is not limited thereto. For example, the light blocking layer 360 may be provided on a top surface of the protective layer 320, a bottom surface of the protective layer 320, a top surface of the window 340, or a bottom surface of the window 340. Also, the light blocking layer 360 may be provided as a plurality of layers. In this case, a portion of the light blocking layer 360 may be disposed on the top surface of the impact absorbing layer 370, the other portion may be disposed on the top surface of the protective layer 320, the bottom surface of the protective layer 320, the top surface of the window 340, or the bottom surface of the window 340.

The impact absorbing layer 370 may be a functional layer configured to protect the display module 100 from an external impact. The impact absorbing layer 370 may be selected from films having an elastic modulus of about 1 GPa or more at room temperature. The impact absorbing layer 370 may be a stretched film including an optical function. For example, the impact absorbing layer 370 may be an optical axis control film. The impact absorbing layer 370 may have a thickness of about 41 micrometers, but the thickness of the impact absorbing layer 370 is not limited thereto. In ab embodiment of the inventive concept, the impact absorbing layer 370 may be omitted.

The second hard coating layer 380 may be provided on a surface of the impact absorbing layer 370. The impact absorbing layer 370 may include a curved surface. The top surface of the impact absorbing layer 370 may contact the second upper adhesive layer 350. Thus, the curved portion of the top surface of the impact absorbing layer 370 may be filled by the second upper adhesive layer 350. Thus, an optical issue may not occur on the top surface of the impact absorbing layer 370. The bottom surface of the impact absorbing layer 370 may be planarized by the second hard coating layer 380. As the second hard coating layer 380 covers the surface of the impact absorbing layer 370, a haze that occurs on the surface of the impact absorbing layer 370 may be prevented.

The upper member 300 may be bonded to the anti-reflection member 200 through the second adhesive layer 1020. The second adhesive layer 1020 may include a common adhesive or a sticking agent. The second adhesive layer 1020 may have a thickness of about 25 micrometers, and the thickness of the second adhesive layer 1020 is not limited thereto.

The lower functional layers may be disposed below the display module 100. In detail, the lower functional layers may include a lower protective film 400, a cushion member 500, a first lower member 600, a second lower member 700, and a step compensation member 800. The components included in the lower functional layers are not limited to the components described above. At least a portion of the above-described components may be omitted, and other components may be added.

The lower protective film 400 may be bonded to the rear surface of the display module 100 through the third adhesive layer 1030. The lower protective film 400 may prevent scratches from being generated on the rear surface of the display module 100 during the process of manufacturing the display module 100. The lower protective film 400 may be a colored polyimide film. For example, the lower protective film 400 may be an opaque yellow film, but is not limited thereto.

The lower protective film 400 may have a thickness of about 40 micrometers, and the thickness of the third adhesive layer 1030 may be 18 micrometers. However, the thickness of the lower protective film 400 and the thickness of the third adhesive layer 1030 are not limited thereto.

The cushion member 500 may be disposed below the lower protective film 400. The cushion member 500 may protect the display module 100 from an impact transmitted from the lower portion. The impact resistance characteristics of the display device 1000 may be improved by the cushion member 500.

The cushion member 500 may include a first cushion adhesive layer 510, a barrier film 520, a cushion layer 530, and a second cushion adhesive layer 540. The components included in the cushion member 500 are not limited to the components described above. At least a portion of the above-described components may be omitted, and other components may be added.

The first cushion adhesive layer 510 and the second cushion adhesive layer 540 may include a common adhesive or an adhesive agent. The first cushion adhesive layer 510 may be attached to the lower protective film 400, and the second cushion adhesive layer 540 may be attached to the first lower member 600. The first cushion adhesive layer 510 may have a thickness of about 25 micrometers, and the thickness of the second cushion adhesive layer 540 may be 8 micrometers. However, the thickness of each of the first cushion adhesive layer 510 and the second cushion adhesive layer 540 is not limited thereto.

The barrier film 520 may be provided to improve impact resistance performance. The barrier film 520 may serve to prevent the display module 100 from being deformed. The barrier film 520 may be a synthetic resin film, for example, a polyimide film, but is not limited thereto. The barrier film 520 may have a thickness of about 35 micrometers, but the thickness of the barrier film 520 is not limited thereto.

The cushion layer 530 may include, for example, foamed foam or sponge. The foamed foam may include polyurethane foam or thermoplastic polyurethane foam. When the cushion layer 530 includes the foamed foam, the cushion layer 530 may be formed by using the barrier film 520 as a base layer. For example, a foaming agent may be foamed on the barrier film 520 to form the cushion layer 530.

The cushion layer 530 may have a thickness of about 100 micrometers, but the thickness of the cushion layer 530 is not limited thereto.

At least one of the barrier film 520 or the cushion layer 530 may have a color that absorbs light. For example, at least one of the barrier film 520 or the cushion layer 530 may have a black color. In this case, the components disposed below the cushion member 500 may be prevented from being visible from the outside.

The first lower member 600 may be disposed below the cushion member 500. The first lower member 600 may include a plate 610, a lower adhesive layer 620, and a cover layer 630. The components included in the first lower member 600 are not limited to the components described above. At least a portion of the above-described components may be omitted, and other components may be added.

The plate 610 may include a material having an elastic modulus of about 60 GPa or more at room temperature. For example, the plate 610 may be SUS304, but is not limited thereto. The plate 610 may support components disposed at an upper side. Also, the heat dissipation performance of the display device 1000 may be improved by the plate 610.

An opening 611 may be defined in a portion of the plate 610. The opening 611 may be defined in an area overlapping the second region 1000A2. The opening 611 may overlap the second region 1000A2 on the plane, for example, when viewed in the third direction DR3, A portion of the plate 610 may be more easily deformed by the opening 611.

The cover layer 630 may be attached to the plate 610 by the lower adhesive layer 620. The lower adhesive layer 620 may include a common adhesive or an adhesive agent. The cover layer 630 may cover the opening 611 of the plate 610. Thus, foreign substances may be additionally prevented from being into the opening 611.

The cover layer 630 may include a material having an elastic modulus less than that of the plate 610. For example, the cover layer 630 may include thermoplastic polyurethane, but is not limited thereto.

The plate 610 may be have a thickness of about 150 micrometers, the lower adhesive layer 620 may have a thickness of about 8 micrometers, and the cover layer 630 may have a thickness of about 8 micrometers. However, the thickness of the plate 610, the thickness of the lower adhesive layer 620, and the thickness of the cover layer 630 are not limited to the above-described values.

The second lower member 700 may be disposed below the first lower member 600. According to an embodiment of the inventive concept, the second lower member 700 may include a first portion and a second portion, which are spaced apart from each other with the folding axis FX therebetween. The first portion may overlap the first region 1000A1 and the second portion may overlap the third region 1000A3. For example, the first portion and the second portion may be spaced apart from each other with the second region 1000A2 therebetween. In this case, as illustrated in FIG. 2, the second lower member 700 may have a non-overlapping structure in the second region 1000A2.

The second lower member 700 may be attached to the first lower member 600 by the fourth adhesive layers 1040. For example, one fourth adhesive layer 1040 may be attached to the bottom surface of the first lower member 600 overlapping the first region 1000A1, and the other fourth adhesive layer 1040 may be attached to the bottom surface of the first lower member 600 overlapping the third region 1000A3. That is, the fourth adhesive layers 1040 may not overlap the second region 1000A2. Each of the fourth adhesive layers 1040 may have a thickness of about 8 micrometers, but the thickness of each of the fourth adhesive layers 1040 is not limited thereto.

Although not illustrated, a step compensation film may be further disposed between the second lower member 700 and the first lower member 600. For example, the step compensation film may be provided on an area overlapping the second region 1000A2. One surface of the step compensation film may have adhesive force less than that of the other surface. For example, the one surface may not have adhesive force. The one surface may be a surface facing the first lower member 600.

Figure 4:
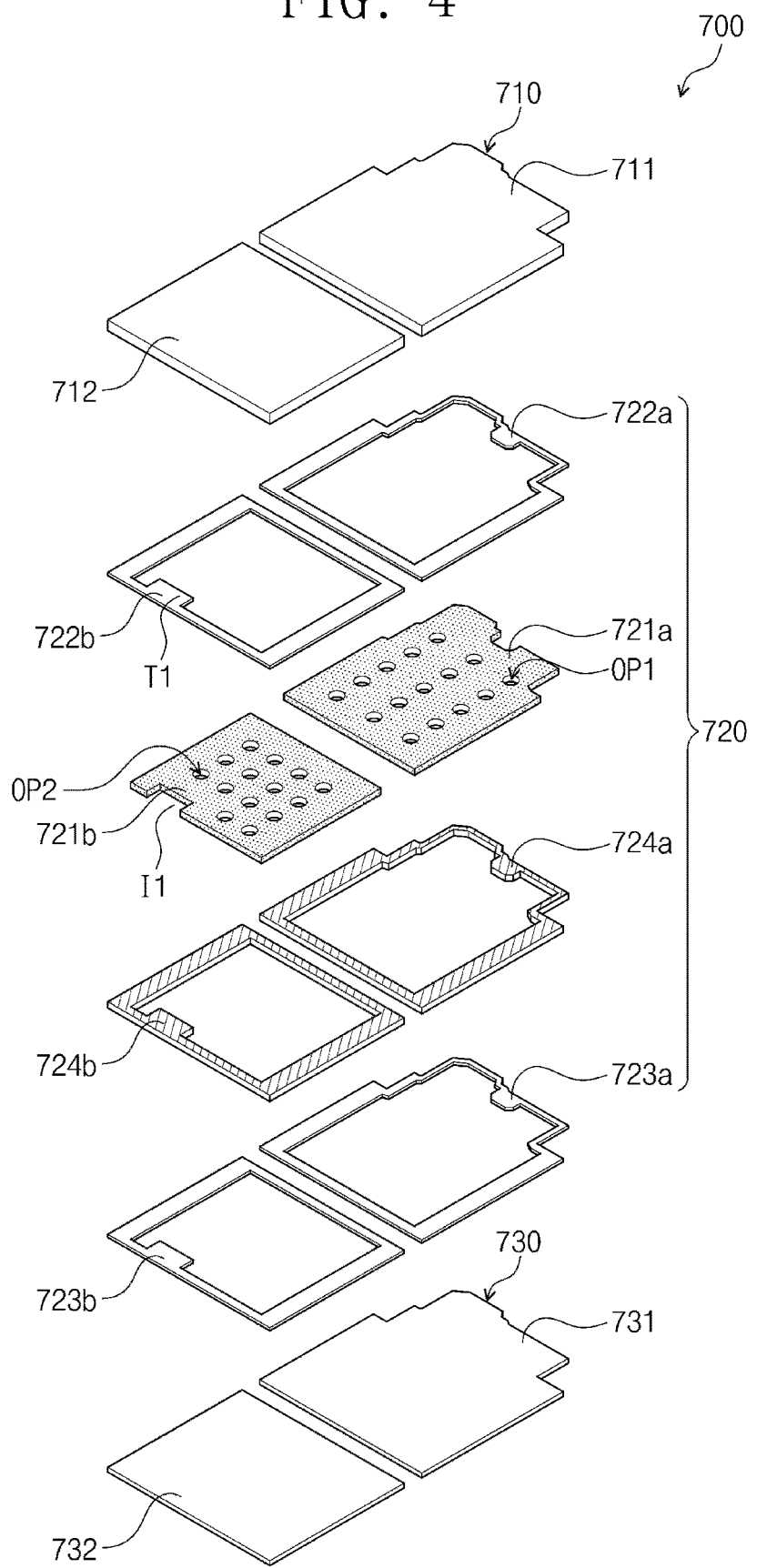
FIG. 4 is an exploded perspective view illustrating a second lower member according to an embodiment of the inventive concept.

FIG. 4 is an exploded perspective view illustrating the second lower member according to an embodiment of the inventive concept. Hereinafter, the second lower member 700 will be described in more detail with reference to FIGS. 2 and 4.

The second lower member 700 may include a lower plate 710, a heat dissipation sheet 720, and an insulating film 730.

The lower plate 710 is disposed between the first lower member 600 and the heat dissipation sheet 720. The lower plate 710 includes a first plate 711 overlapping the first region 1000A1 and a second plate 712 overlapping the third region 1000A3. According to an embodiment, the first plate 711 and the second plate 712 may be spaced apart from each other with the second region 1000A2 therebetween.

The lower plate 710 may serve to prevent the components disposed above the second lower member 700 from being deformed by the components disposed below the second lower member 700.

For example, the lower plate 710 may include a metal alloy, for example, a copper alloy. However, the material constituting the lower plate 710 is not limited thereto. The lower plate 710 may have a thickness of about 80 micrometers, and the thickness of the lower plate 710 is not limited thereto.

The heat dissipation sheet 720 may be disposed between the lower plate 710 and the insulating film 730. The heat dissipation sheet 720 may be attached to a lower portion of the lower plate 710 and may be attached to an upper portion of the insulating film 730. According to the inventive concept, the heat dissipation sheet 720 may be a heat conductive sheet having high thermal conductivity.

In detail, the heat dissipation sheet 720 may include a heat dissipation layer 721, a first heat dissipation adhesive layer 722, a second heat dissipation adhesive layer 723, and an auxiliary adhesive layer 724.

The first heat dissipation adhesive layer 722 may be disposed below the lower plate 710 and may be attached to a bottom surface of the lower plate 710. The first heat dissipation adhesive layer 722 may include a first adhesive portion 722a overlapping the first region 1000A1 and a second adhesive portion 722b overlapping the third region 1000A3. According to an embodiment, the first adhesive portion 722a and the second adhesive portion 722b may be spaced apart from each other with the second region 1000A2 therebetween.

The second heat dissipation adhesive layer 723 may be disposed on the insulating film 730 and may be attached to a top surface of the insulating film 730. The second heat dissipation adhesive layer 723 may include a third adhesive portion 723a overlapping the first region 1000A1 and a fourth adhesive portion 723b overlapping the third region 1000A3. The third adhesive portion 723a may correspond to the first adhesive portion 722a, and the fourth adhesive portion 723b may overlap the second adhesive portion 722b. According to an embodiment, the third adhesive portion 723a and the fourth adhesive portion 723b may be spaced apart from each other with the second region 1000A2 therebetween.

The heat dissipation layer 721 may be disposed between the first heat dissipation adhesive layer 722 and the second heat dissipation adhesive layer 723. The heat dissipation layer 721 includes a first heat dissipation portion 721a disposed between the first adhesive portion 722a and the third adhesive portion 723a and a second heat dissipation portion 721b disposed between the second adhesive portion 722b and the fourth adhesive portion 723b. According to an embodiment, the first heat dissipation portion 721a and the second heat dissipation portion 721b may be spaced apart from each other with the second region 1000A2 therebetween.

According to the inventive concept, the heat dissipation layer 721 may be a graphitized polymer film. The polymer film may be, for example, a polyimide film. However, the material of the heat dissipation layer 721 is not limited thereto and may include other materials. For example, the heat dissipation layer 721 may include graphite, aluminum (Al), nickel (Ni), platinum (Pt), silver (Ag), gold (Au), or a combination thereof.

The first heat dissipation portion 721a may define at least one first opening OP1, and the second heat dissipation portion 721b may define at least one second opening OP2. The first adhesive portion 722a and the third adhesive portion 723a may adhere to each other through the first opening OP1, and the second adhesive portion 722b and the fourth adhesive portion 723b may adhere to each other through the second opening OP2. This will be described in more detail later with reference to FIGS. 9 and 10.

The auxiliary adhesive layer 724 may be disposed between the first heat dissipation adhesive layer 722 and the second heat dissipation adhesive layer 723. The auxiliary adhesive layer 724 includes a first auxiliary adhesive portion 724a overlapping the first region 1000A1 and a second auxiliary adhesive portion 724b overlapping the third region 1000A3. According to an embodiment, the first auxiliary adhesive portion 724a and the second auxiliary adhesive portion 724b may be spaced apart from each other with the second region 1000A2 therebetween.

The first auxiliary adhesive portion 724a may be disposed between the first adhesive portion 722a and the third adhesive portion 723a to surround the first heat dissipation portion 721a on the plane. The second auxiliary adhesive portion 724b may be disposed between the second adhesive portion 722b and the fourth adhesive portion 723b to surround the second heat dissipation portion 721b on the plane.

For example, each of the first auxiliary adhesive portion 724a and the second auxiliary adhesive portion 724b may be a double-sided adhesive tape. A top surface of the first auxiliary adhesive portion 724a may be attached to the first adhesive portion 722a, and a bottom surface of the first auxiliary adhesive portion 724a may adhere to the third adhesive portion 723a. A top surface of the second auxiliary adhesive portion 724b may be attached to the second adhesive portion 722b, and a bottom surface of the second auxiliary adhesive portion 724b may adhere to the fourth adhesive portion 723b.

That is, the first heat dissipation adhesive layer 722 and the second heat dissipation adhesive layer 723 may have a structure in which the first heat dissipation adhesive layer 722 and the second heat dissipation adhesive layer 723 adhere to each other through the auxiliary adhesive layer 724. In particular, as the first heat dissipation adhesive layer 722 and the second heat dissipation adhesive layer 723 adhere to each other through the auxiliary adhesive layer 724, adhesive force between the first heat dissipation adhesive layer 722 and the second heat dissipation adhesive layer 723 may be more improved. As a result, the peeling phenomenon between the first heat dissipation adhesive layer 722 and the second heat dissipation adhesive layer 723 may be prevented.

According to an embodiment of the inventive concept, the first heat dissipation portion 721a may be sealed by the first adhesive portion 722a, the third adhesive portion 723a, and the first auxiliary adhesive portion 724a. The second heat dissipation portion 721b may be sealed by the second adhesive portion 722b, the fourth adhesive portion 723b, and the second auxiliary adhesive portion 724b.

Also, each of the first heat dissipation adhesive layer 722 and the second heat dissipation adhesive layer 723 may have a thickness of about 5 micrometers, and each of the heat dissipation layer 721 and the auxiliary adhesive layer 724 may have a thickness of about 17 micrometers. According to the present invention, the heat dissipation layer 721 may have a thickness greater than the sum of the thicknesses of the first heat dissipation adhesive layer 722 and the second heat dissipation adhesive layer 723. However, the thickness of each of the first heat dissipation adhesive layer 722, the second heat dissipation adhesive layer 723, the heat dissipation layer 721, and the auxiliary adhesive layer 724 is not limited to the above-described numerical values.

As described above, the heat dissipation layer 721 may be attached to a bottom surface of the lower plate 710 by the first heat dissipation adhesive layer 722 and be attached to a top surface of the insulating film 730 by the second heat dissipation adhesive layer 723.

The insulating film 730 may be attached to a lower portion of the heat dissipation sheet 720. For example, the insulating film 730 may be attached to the second heat dissipation adhesive layer 723. The insulating film 730 includes a first insulating film 731 overlapping the third adhesive portion 723a and a second insulating film 732 overlapping the fourth adhesive portion 723b. The display device 1000 may be prevented from being rattled by the insulating film 730. According to an embodiment, the first insulating film 731 and the second insulating film 732 may be spaced apart from each other with the second region 1000A2 therebetween. Also, the insulating film 730 may have a thickness of about 15 micrometers, but is not limited thereto.

The step compensation member 800 may be attached to the lower portion of the plate 610. For example, the lower adhesive layer 620 may be attached to the lower portion of one portion of the plate 610, and the step compensation member 800 may be attached to the lower portion of the other portion of the plate 610.

The step compensation member 800 may include a first compensation adhesive layer 810, a step compensation film 820, and a second compensation adhesive layer 830. The first compensation adhesive layer 810 may be attached to the bottom surface of the plate 610. The step compensation film 820 may be a synthetic resin film. The second compensation adhesive layer 830 may be attached to a bottom surface and a set (not illustrated) of the step compensation film 820.

Although the shapes of the components included in the second lower member are illustrated as an example in FIG. 4, the shapes of the components included in the second lower member may be variously modified.

Figure 5:
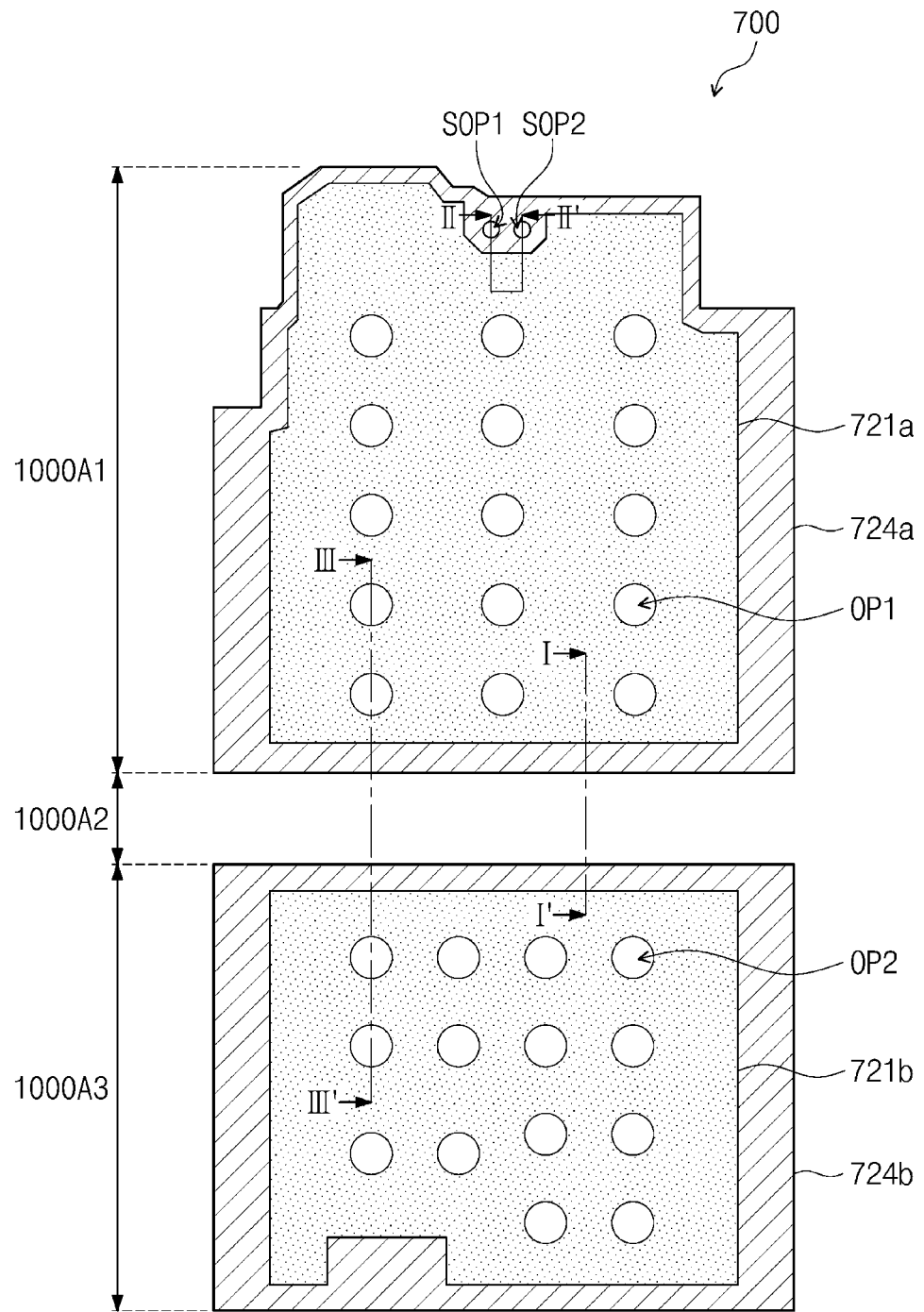
FIG. 5 is a plan view illustrating the second lower member according to an embodiment of the inventive concept.
Figure 6A:
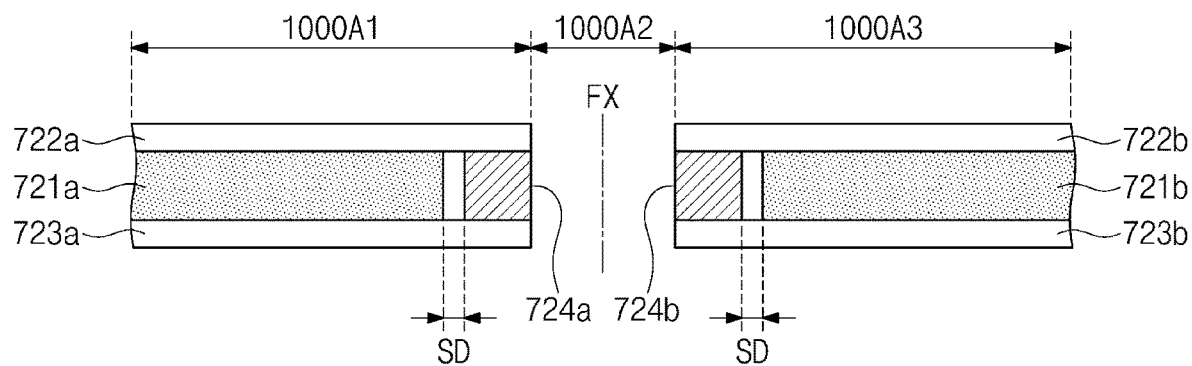
FIG. 6A is a cross-sectional view taken along line I-I' of FIG. 5 according to an embodiment of the inventive concept.
Figure 6B:
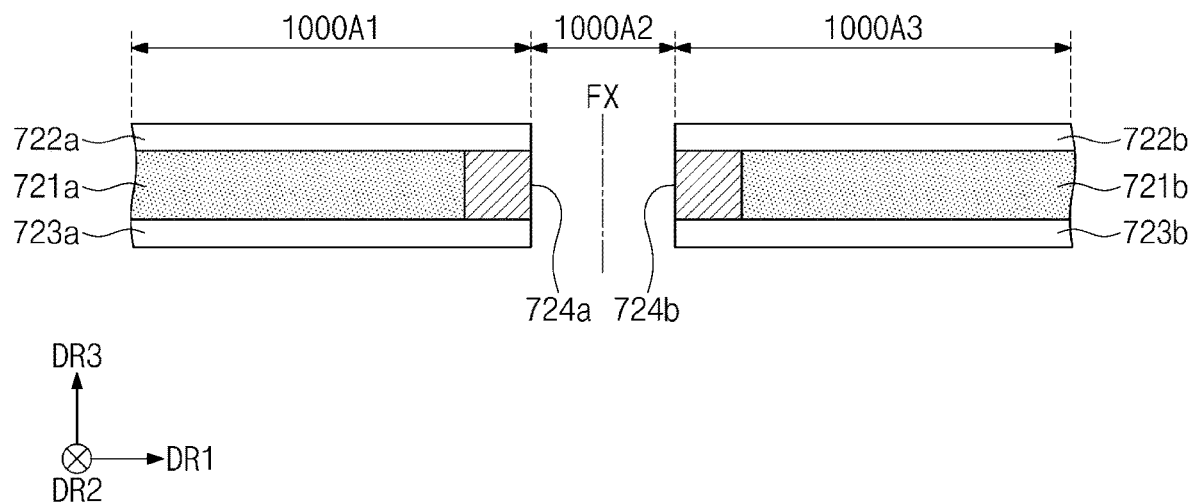
FIG. 6B is a cross-sectional view taken along line I-I' of FIG. 5 according to another embodiment of the inventive concept.

FIG. 5 is a plan view illustrating the second lower member 700 according to an embodiment of the inventive concept. FIG. 6A is a cross-sectional view taken along line I-I' of FIG. 5 according to an embodiment of the inventive concept. FIG. 6B is a cross-sectional view taken along line I-I' of FIG. 5 according to another embodiment of the inventive concept.

The configurations of the heat dissipation layer 721 combined with the auxiliary adhesive layer 724 among the configurations of the heat dissipation sheet 720 illustrated in FIG. 4 are illustrated in FIG. 5.

Referring to FIG. 5, the first auxiliary adhesive portion 724a may surround the first heat dissipation portion 721a on the plane, and the second auxiliary adhesive portion 724b may surround the second heat dissipation portion 721b on the plane. The first auxiliary adhesive portion 724a may have a shape spaced apart from the second auxiliary adhesive portion 724b with the second region 1000A2 therebetween. According to an embodiment, the first auxiliary adhesive portion 724a and the second auxiliary adhesive portion 724b are illustrated as having a non-overlapping structure in the second region 1000A2, but are not limited thereto. At least a portion of each of the first auxiliary adhesive portion 724a and the second auxiliary adhesive portion 724b may have a structure overlapping the second region 1000A2, which will be described later with reference to FIG. 12.

In order to facilitate and maintain connections between the various layers of the heat dissipation sheet 720, the layers that make up the heat dissipation sheet 720 may be formed to connect with each other and have some matching shape aspects. For example, the second adhesive portion 722b, the fourth adhesive portion 723b, and the second auxiliary adhesive portion 724b may each have three sides of a rectangle that are substantially straight, and a fourth side that has a tab in the shape of T1 protruding therefrom. The second heat dissipation portion 721b may have an indentation I1 that connects with tab of the second auxiliary adhesive portion 724b to form the combined layer illustrated in FIG. 5.

The second adhesive portion 722b, the fourth adhesive portion 723b, and the second auxiliary adhesive portion 724b all have substantially the same shape so as to facilitate stacking of the layers with minimal interference.

Similarly, the first adhesive portion 722a, the third adhesive portion 723a, and the first auxiliary adhesive portion 724a all have relatively the same shape with a tab protruding into an internal part of the perimeter. The tab of the first auxiliary adhesive portion 724a is configured to connect with an indentation of the first heat dissipation portion 721a. Differing from the "b" side of the heat dissipation sheet 720, the "a" side structures may have additional ridges and a contoured shape to facilitate connection between layers. The "a" side layers may be of greater overall dimension and have additional connection ridges and edges.

Referring to FIG. 6A, the first heat dissipation portion 721a and the first auxiliary adhesive portion 724a are disposed between the first adhesive portion 722a and the third adhesive portion 723a. The first auxiliary adhesive portion 724a may not overlap the first heat dissipation portion 721a in the third direction DR3 and may surround the first heat dissipation portion 721a on the plane along the first direction DR1.

The second heat dissipation portion 721b and the second auxiliary adhesive portion 724b are disposed between the second adhesive portion 722b and the fourth adhesive portion 723b. The second auxiliary adhesive portion 724b may not overlap the second heat dissipation portion 721b in the third direction DR3 and may surround the second heat dissipation portion 721b on the plane along the first direction DR1.

For example, the first auxiliary adhesive portion 724a may have a structure that overlaps the vicinity of an edge of the first adhesive portion 722a or the third adhesive portion 723a in the third direction DR3, and the second auxiliary adhesive portion 724b may have a structure that overlaps the vicinity of an edge of the second adhesive portion 722b or the fourth adhesive portion 723b in the third direction DR3.

According to an embodiment of the inventive concept, the auxiliary adhesive layer 724 may have a structure spaced apart from the heat dissipation layer 721. For example, the first heat dissipation portion 721a may be spaced a predetermined distance SD from the first auxiliary adhesive portion 724a, and the second heat dissipation portion 721b may be spaced the predetermined distance SD from the second auxiliary adhesive portion 724b. As a result, inner spaces may be defined between the first heat dissipation portion 721a and the first auxiliary adhesive portion 724a and between the second heat dissipation portion 721b and the second auxiliary adhesive portion 724b, respectively.

Referring to FIG. 6b, the second lower member 700 may have a structure that at least partially contacts the auxiliary adhesive layer 724 to the heat dissipation layer 721. For example, the first heat dissipation portion 721a may have a structure that at least partially contacts the first auxiliary adhesive portion 724a, and the second heat dissipation portion 721b may have a structure that at least partially the second auxiliary adhesive portion 724b.

Figure 7:
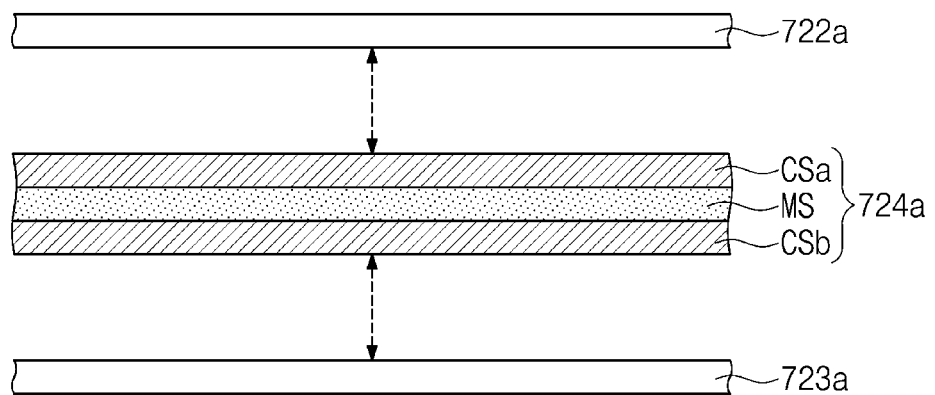
FIG. 7 is a cross-sectional view illustrating an adhesive sheet of FIG. 5 according to an embodiment of the inventive concept.

FIG. 7 is a cross-sectional view illustrating the first auxiliary adhesive portion 724a, the first adhesive portion 722a, and the third adhesive portion 723a of FIG. 5 according to an embodiment of the inventive concept.

Each of the first auxiliary adhesive portion 724a and the second auxiliary adhesive portion 724b according to the inventive concept may include a plurality of layers. Hereinafter, the layered structure of the first auxiliary adhesive portion 724a is exemplarily described in FIG. 7, but the structure of the second auxiliary adhesive portion 724b may have also substantially the same as that of the first auxiliary adhesive portion 724a.

Referring to FIG. 7, the first auxiliary adhesive portion 724a includes a base layer MS, a first adhesive layer CSa, and a second adhesive layer CSb. The first adhesive layer CSa may be disposed on a top surface of the base layer MS attached to the first adhesive portion 722a, and the second adhesive layer CSb may be disposed on a bottom surface of the base layer MS attached to the third adhesive portion 723a.

Each of the first heat dissipation adhesive layer 722 and the second heat dissipation adhesive layer 723 described in FIG. 4 may be provided as a single adhesive layer. For example, each of the first heat dissipation adhesive layer 722 and the second heat dissipation adhesive layer 723 may correspond to one adhesive layer of the first adhesive layer CSa and the second adhesive layer CSb included in the first auxiliary adhesive portion 724a.

Figure 8:
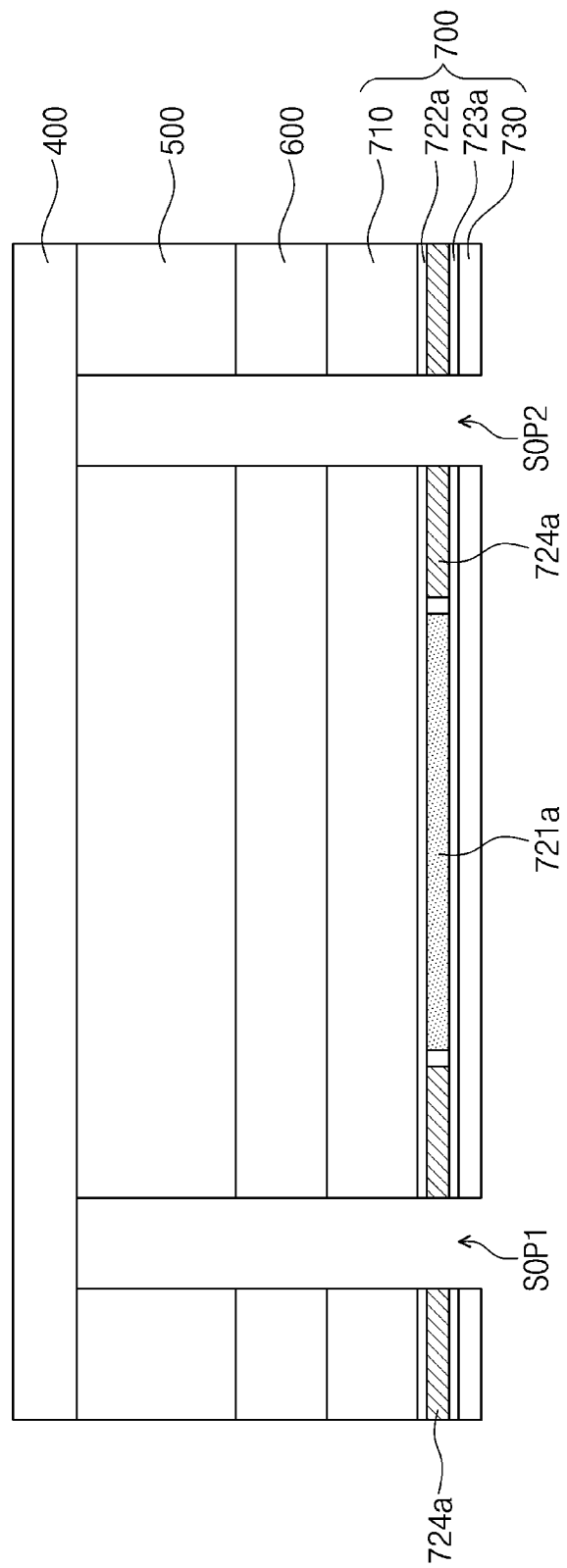
FIG. 8 is a cross-sectional view taken along line of FIG. 5 according to an embodiment of the inventive concept.

FIG. 8 is a cross-sectional view taken along line II-II' of FIG. 5 according to an embodiment of the inventive concept.

According to the inventive concept, the first auxiliary adhesive portion 724a illustrated in FIG. 5 may define at least one sensor opening SOP1 and SOP2. In this specification, the sensor openings SOP1 and SOP2 are illustratively described as including a first sensor opening SOP1 and a second sensor opening SOP2.

The first sensor opening SOP1 and the second sensor opening SOP2 may correspond to the second sensing area 100SA2 and the third sensing area 100SA3 of the plurality of sensing areas 100SA1, 100SA2, and 100SA3 illustrated in FIG. 1A, respectively. Although not illustrated, referring to FIG. 8, in the first sensing area 100SA1, each of each of the first sensor opening SOP1 and the second sensor opening SOP2 may overlap the first auxiliary adhesive portion 724a and have an opening shape that passes through the cushion member 500, the first lower member 600, and the second lower member 700.

In this case, each of the first sensor opening SOP1 and the second sensor opening SOP2 may not overlap the heat dissipation layer 721.

Although not illustrated, a first sensor may be disposed below the second lower member 700 overlapping the first sensor opening SOP1, and a second sensor may be disposed below the second lower member 700 overlapping the second sensor opening SOP2. For example, the first sensor may be an illumination sensor, and the second sensor may be a proximity sensor.

Figure 9:
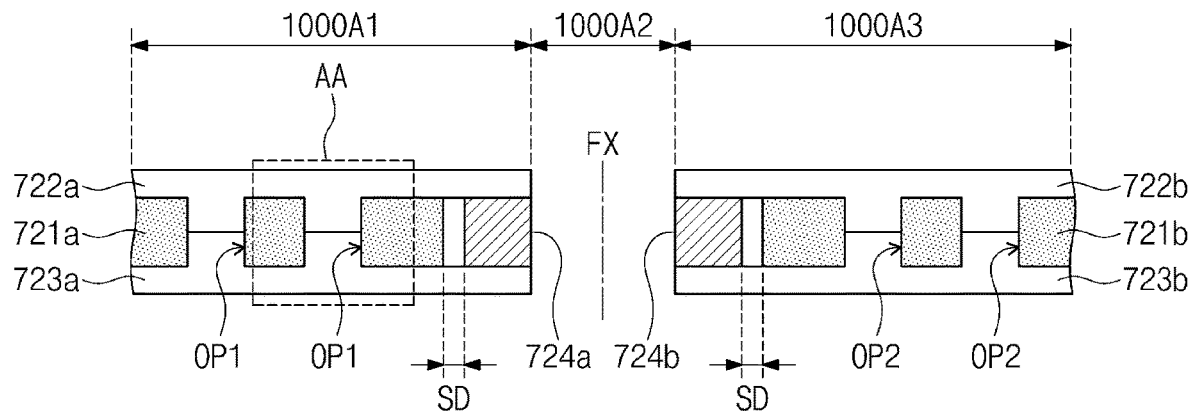
FIG. 9 is a cross-sectional view taken along line of FIG. 5 according to an embodiment of the inventive concept.
Figure 10:
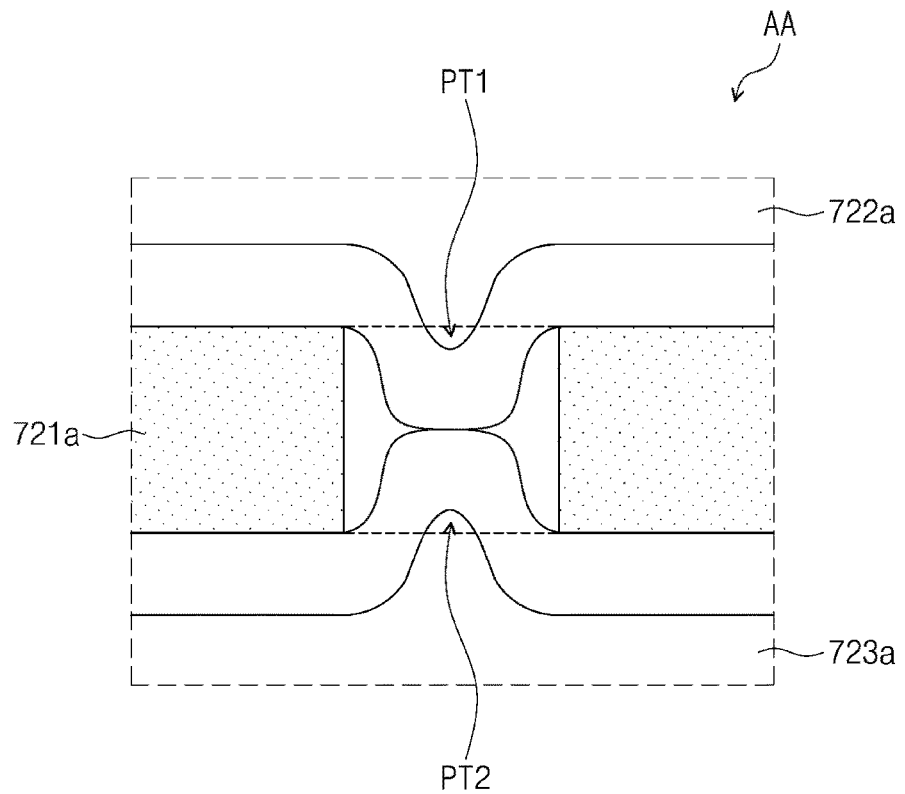
FIG. 10 is an enlarged view of a region AA of FIG. 9.

FIG. 9 is a cross-sectional view taken along line of FIG. 5 according to an embodiment of the inventive concept. FIG. 10 is an enlarged view of a region AA of FIG. 9.

First, as illustrated in FIG. 5, the first heat dissipation portion 721a includes a plurality of first openings OP1 spaced apart from each other, and the second heat dissipation portion 721b includes a plurality of second openings OP2 spaced apart from each other.

Referring to FIG. 9, the first adhesive portion 722a and the third adhesive portion 723a may adhere to each other through the first openings OP1. The second adhesive portion 722b and the fourth adhesive portion 723b may adhere to each other through the second openings OP2.

As the first adhesive portion 722a and the third adhesive portion 723a directly contact each other through the first openings OP1, the first heat dissipation portion 721a disposed between the first adhesive portion 722a and the third adhesive portion 723a may be prevented from moving. Similarly, as the second adhesive portion 722b and the fourth adhesive portion 723b directly contact each other through the second openings OP2, the second heat dissipation portion 721b disposed between the second adhesive portion 722b and the fourth adhesive portion 723b may be prevented from moving.

In particular, as illustrated in FIG. 10, the first adhesive portion 722a overlapping the first openings OP1 may have a recessed first shape PT1, and the third adhesive portion 723a overlapping the first openings OP1 may have a recessed second shape PT2. The recessed first shape PT1 and the recessed second shape PT2 may be formed by pressing the first adhesive portion 722a and the third adhesive portion 723a in the first openings OP1. Although not illustrated, the second adhesive portion 722b and the fourth adhesive portion 723b overlapping the second openings OP2 may also have the recessed shape.

Figure 11:
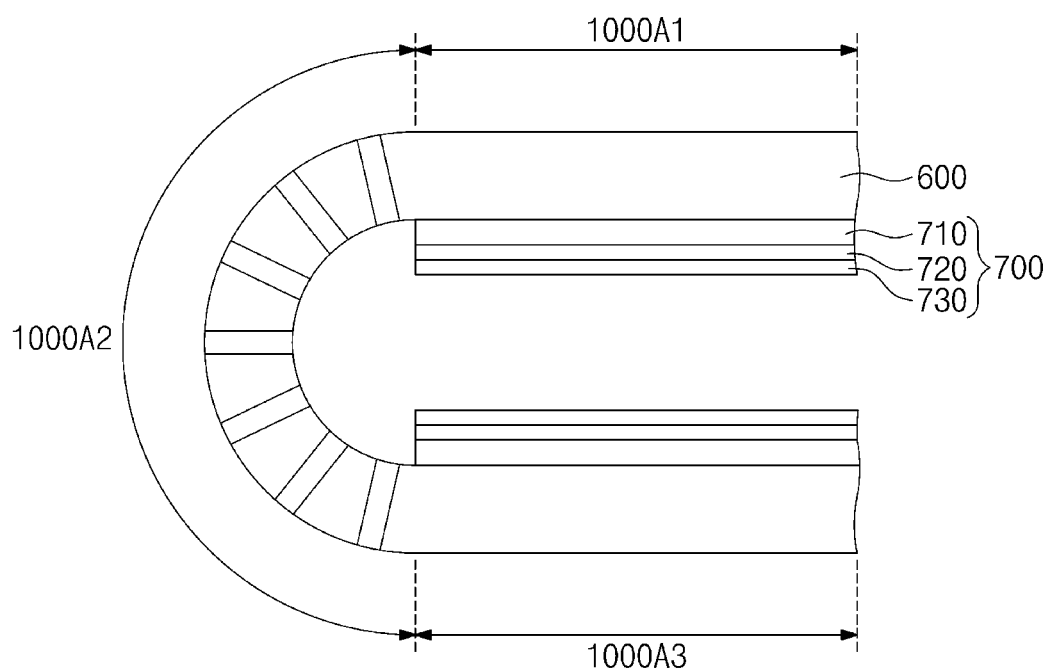
FIG. 11 is a cross-sectional view illustrating the second lower member depending on a folding operation according to an embodiment of the inventive concept.

FIG. 11 is a cross-sectional view illustrating the second lower member 700 in the midst of a folding operation according to an embodiment of the inventive concept.

Referring to FIG. 11, the first lower member 600 and the second lower member 700 according to the folding of the display device 1000 illustrated in FIG. 1A are illustrated.

The first lower member 600 may have a structure overlapping each of the first to third regions 1000A1, 1000A2, and 1000A3. The second lower member 700 may have a structure overlapping the first region 1000A1 and the third region 1000A3 and may have a structure that does not overlap the second region 1000A2.

That is, in the structure in which the display device 1000 is folded, the second lower member 700 may have a structure overlapping only the first region 1000A1 and the third region 1000A3.

Figure 12:
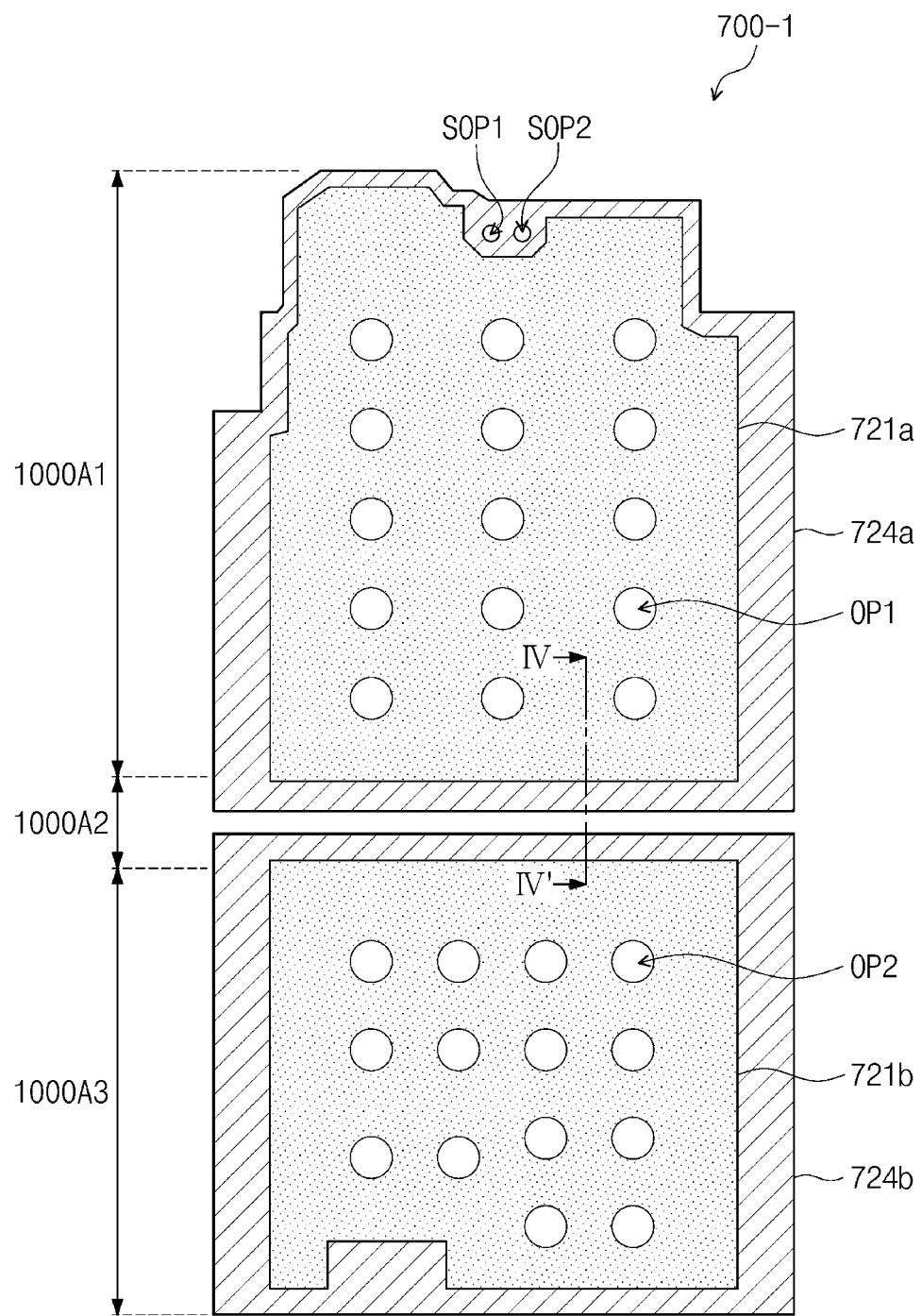
FIG. 12 is a plan view illustrating a second lower member according to another embodiment of the inventive concept.
Figure 13A:
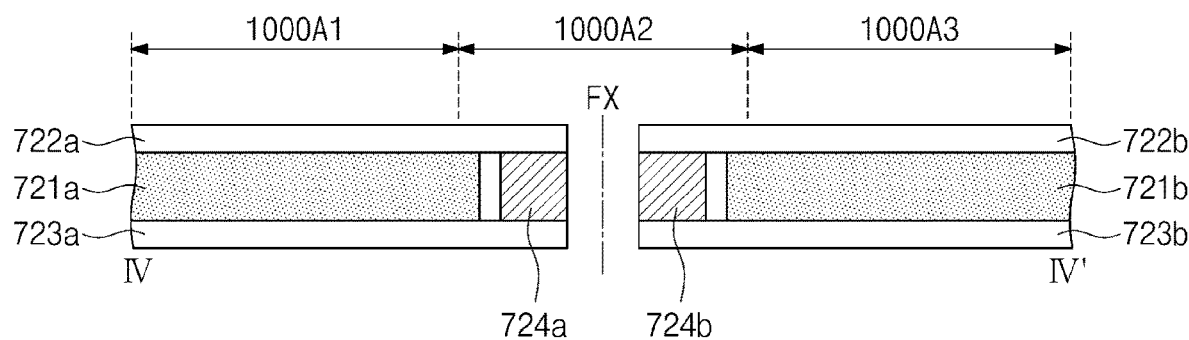
FIG. 13A is a cross-sectional view taken along line IV-IV' of FIG. 12 according to another embodiment of the inventive concept.
Figure 13B:
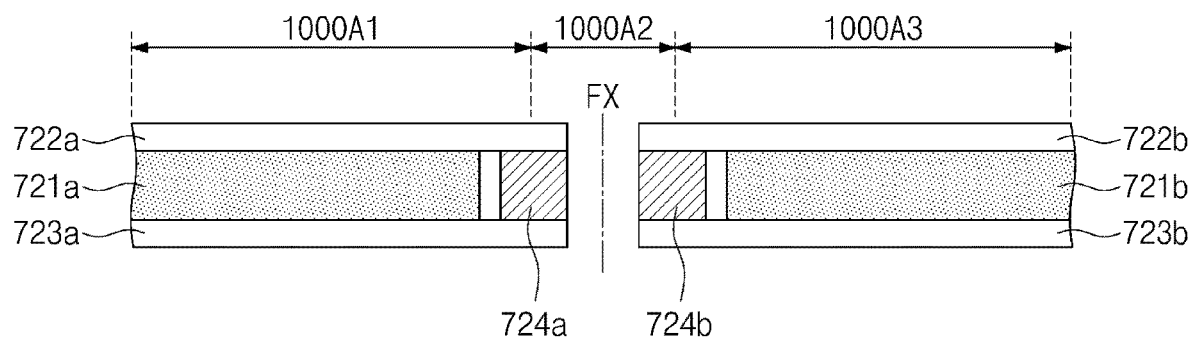
FIG. 13B is a cross-sectional view illustrating an adhesive sheet according to another embodiment of the inventive concept.

FIG. 12 is a plan view illustrating a second lower member 700-1 according to another embodiment of the inventive concept. FIG. 13A is a cross-sectional view taken along line IV-IV' of FIG. 12 according to another embodiment of the inventive concept. FIG. 13B is a cross-sectional view illustrating an adhesive sheet according to another embodiment of the inventive concept.

A second lower member 700-1 illustrated in FIG. 12 may have substantially the same structure as the second lower member 700 illustrated in FIG. 5 except that a range of a second region 1000A2 is changed when compared to the second lower member 700 illustrated in FIG. 5.

Referring to FIG. 12, at least a portion of the second lower member 700-1 adjacent to a folding axis FX may overlap the second region 1000A2. In detail, each of a lower plate 710, a heat dissipation sheet 720, and an insulating film 730 may be divided into a first portion and a second portion with the folding axis FX therebetween as described with reference to FIG. 4.

Each of the lower plate 710, the heat dissipation sheet 720, and the insulating film 730 of the second lower member 700 illustrated in FIG. 5 may have a structure that does not overlap the second region 1000A2. On the other hand, at least a portion of each of the lower plate 710, the heat dissipation sheet 720, and the insulating film 730 of the second lower member 700-1 illustrated in FIG. 12 may overlap the second region 1000A2.

Referring to FIG. 13A, for example, a portion of the first auxiliary adhesive member 724a and a portion of the second auxiliary adhesive member 724b, which face each other with the folding shaft FX between may overlap the second region 1000A2. Also, a portion of the first heat dissipation portion 721a and a portion of the second heat dissipation portion 721b, which face each other with the folding shaft FX therebetween may also overlap the second region 1000A2.

Referring to FIG. 13B, as another example, a portion of the first auxiliary adhesive member 724a and a portion of the second auxiliary adhesive member 724b, which face each other with the folding shaft FX between may overlap the second region 1000A2. However, each of the first heat dissipation portion 721a and the second heat dissipation portion 721b may have a structure that does not overlap the second region 1000A2.

According to the embodiment of the inventive concept, the heat dissipation sheet may include the first heat dissipation adhesive layer, the second heat dissipation adhesive layer, and the heat dissipation layer and the auxiliary adhesive layer, which are disposed between the first heat dissipation adhesive layer and the second heat dissipation adhesive layer. In particular, the heat dissipation layer may be sealed by the first heat dissipation adhesive layer, the second heat dissipation adhesive layer, and the auxiliary adhesive layer. As the heat dissipation layer is sealed by the first heat dissipation adhesive layer, the second heat dissipation adhesive layer, and the auxiliary adhesive layer, the heat dissipation layer may be prevented from moving.

In addition, as the first heat dissipation adhesive layer and the second heat dissipation adhesive layer adhere to each other through the auxiliary adhesive layer, the adhesion between the first heat dissipation adhesive layer and the second heat dissipation adhesive layer may be further improved. As a result, the peeling phenomenon between the first heat dissipation adhesive layer and the second heat dissipation adhesive layer may be prevented.

As described above, the embodiment is disclosed in the drawings and the specification. While specific terms were used, they were not used to limit the meaning or the scope of the inventive concept described in claims, but merely used to explain the inventive concept. Accordingly, a person having ordinary skill in the art will understand from the above that various modifications and other equivalent embodiments are also possible. Hence, the real protective scope of the present invention shall be determined by the technical scope of the accompanying claims.

What is claimed is:

1. A display device comprising:
    a display module in which a folding region and a non-folding region adjacent to the folding region are defined; and
    a heat dissipation sheet disposed on one surface of the display module,
    wherein the heat dissipation sheet comprises:
    a first heat dissipation adhesive layer overlapping the non-folding region;
    a second heat dissipation adhesive layer overlapping the first heat dissipation adhesive layer;
    a heat dissipation layer disposed between the first heat dissipation adhesive layer and the second heat dissipation adhesive layer; and
    an auxiliary adhesive layer adjacent to an edge of the heat dissipation layer, wherein the heat dissipation layer and the auxiliary adhesive layer are spaced apart from each other.

2. The display device of claim 1, wherein the auxiliary adhesive layer surrounds the edge of the heat dissipation layer.

3. The display device of claim 1, wherein the non-folding region comprises a first non-folding region and a second non-folding region,
    wherein the folding region is disposed between the first non-folding region and the second non-folding region,
    wherein the first heat dissipation adhesive layer comprises:
    a first adhesive portion overlapping the first non-folding region; and
    a second adhesive portion overlapping the second non-folding region,
    wherein the second heat dissipation adhesive layer comprises:
    a third adhesive portion overlapping the first adhesive portion; and
    a fourth adhesive portion overlapping the second adhesive portion,
    wherein the heat dissipation layer comprises:
    a first heat dissipation portion disposed between the first adhesive portion and the third adhesive portion; and
    a second heat dissipation portion disposed between the second adhesive portion and the fourth adhesive portion, and
    wherein the auxiliary adhesive layer comprises:
    a first auxiliary adhesive portion disposed between the first adhesive portion and the third adhesive portion to surround the first heat dissipation portion on a plane; and
    a second auxiliary adhesive portion disposed between the second adhesive portion and the fourth adhesive portion to surround the second heat dissipation portion on the plane.

4. The display device of claim 3, wherein the first heat dissipation portion is sealed by the first adhesive portion, the third adhesive portion, and the first auxiliary adhesive portion, and
    the second heat dissipation portion is sealed by the second adhesive portion, the fourth adhesive portion, and the second auxiliary adhesive portion.

5. The display device of claim 3, wherein the first heat dissipation portion and the first auxiliary adhesive portion are spaced apart from each other, and the second heat dissipation portion and the second auxiliary adhesive portion are spaced apart from each other.

6. The display device of claim 3, wherein each of the first auxiliary adhesive portion and the second auxiliary adhesive portion comprises:
a base layer;
a first adhesive layer disposed between the base layer and the first heat dissipation adhesive layer; and
a second adhesive layer disposed between the base layer and the second heat dissipation adhesive layer.

7. The display device of claim 6, wherein each of the first heat dissipation adhesive layer and the second heat dissipation adhesive layer comprises a single adhesive layer.

8. The display device of claim 3, wherein at least one sensor opening passing through the first adhesive portion, the third adhesive portion, and the first auxiliary adhesive portion is defined.

9. The display device of claim 8, further comprising at least one cover member disposed between the heat dissipation sheet and the display module,
wherein the sensor opening passes through the at least one cover member.

10. The display device of claim 3, wherein the first heat dissipation portion comprises a plurality of first openings, which are spaced apart from each other, and the first adhesive portion and the third adhesive portion adhere to each other through the first openings, and
the second heat dissipation portion comprises a plurality of second openings, which are spaced apart from each other, and the second adhesive portion and the fourth adhesive portion adhere to each other through the second openings.

11. The display device of claim 10, wherein each of the first adhesive portion and the third adhesive portion, which overlap the first openings, has a recessed shape, and
each of the second adhesive portion and the fourth adhesive portion, which overlap the second openings, has a recessed shape.

12. The display device of claim 10, wherein the heat dissipation layer has a thickness greater than the sum of thicknesses of the first heat dissipation adhesive layer and the second heat dissipation adhesive layer in a thickness direction of the display module.

13. The display device of claim 3, wherein the first adhesive portion and the second adhesive portion are spaced apart from each other with the folding axis therebetween.

14. The display device of claim 13, wherein the heat dissipation sheet does not overlap the folding region.

15. The display device of claim 13, wherein at least a portion of each of the first auxiliary adhesive portion and the second auxiliary adhesive portion overlaps the folding region.

16. The display device of claim 15, wherein at least a portion of each of the first heat dissipation portion and the second heat dissipation portion overlaps the folding region.

17. The display device of claim 13, wherein each of the first heat dissipation portion and the second heat dissipation portion does not overlap the folding region.

18. The display device of claim 13, further comprising:
a plate disposed between the display module and the first heat dissipation adhesive layer; and
an insulating film disposed below the second heat dissipation adhesive layer.

19. The display device of claim 18, wherein the plate comprises a first plate overlapping the first adhesive portion and a second plate spaced apart from the first plate and overlapping the second adhesive portion, and
the insulating film comprises a first insulation film overlapping the first plate and a second insulating film spaced apart from the first insulation film and overlapping the second plate.

20. The display device of claim 3, wherein the first heat dissipation portion at least partially contacts the first auxiliary adhesive portion.

* * * * *